United States Patent
Ricaud

(10) Patent No.: US 8,123,164 B2
(45) Date of Patent: Feb. 28, 2012

(54) DEVICE FOR FIXING A SEAT RAIL ON A FLOOR, AND AIRCRAFT EQUIPPED WITH SUCH A FIXING DEVICE

(75) Inventor: Alexandre Ricaud, Pointis de Riviere (FR)

(73) Assignee: Airbus France, Tououse (FR)

( * ) Notice: Subject to any disclaimer, the term of this patent is extended or adjusted under 35 U.S.C. 154(b) by 856 days.

(21) Appl. No.: 11/994,237

(22) PCT Filed: Jun. 26, 2006

(86) PCT No.: PCT/FR2006/001485
§ 371 (c)(1),
(2), (4) Date: Jul. 21, 2008

(87) PCT Pub. No.: WO2007/003752
PCT Pub. Date: Jan. 11, 2007

(65) Prior Publication Data
US 2009/0302157 A1    Dec. 10, 2009

(30) Foreign Application Priority Data
Jun. 30, 2005    (FR) ...................................... 05 51854

(51) Int. Cl.
*B64C 1/18*    (2006.01)
(52) U.S. Cl. ................................................. 244/117 R
(58) Field of Classification Search .............. 244/117 R, 244/119, 118.5, 118.6, 123.4
See application file for complete search history.

(56) References Cited

U.S. PATENT DOCUMENTS

| | | | |
|---|---|---|---|
| 1,441,984 A * | 1/1923 | Jacobs | 244/119 |
| 1,619,372 A * | 3/1927 | Rohrbach | 244/123.4 |
| 2,078,544 A * | 4/1937 | Salzman et al. | 244/123.4 |
| 2,208,683 A * | 7/1940 | Page, Jr. | 244/118.6 |
| 2,236,482 A * | 3/1941 | Zindel | 244/119 |
| 2,827,251 A * | 3/1958 | Doman | 244/119 |
| 4,479,621 A | 10/1984 | Bergholz | |
| 5,083,727 A | 1/1992 | Pompei et al. | |
| 5,086,996 A * | 2/1992 | Roeder et al. | 244/119 |
| 6,554,225 B1 * | 4/2003 | Anast et al. | 244/117 R |
| 6,572,054 B1 * | 6/2003 | Smallhorn | 244/119 |
| 7,100,885 B2 * | 9/2006 | Zerner | 244/118.6 |
| 7,163,178 B2 * | 1/2007 | Ricaud | 244/118.6 |
| 2005/0133666 A1 | 6/2005 | Zerner | |
| 2005/0224648 A1 * | 10/2005 | Grether et al. | 244/118.5 |

FOREIGN PATENT DOCUMENTS

| | | |
|---|---|---|
| EP | 1533174 A | 5/2005 |
| EP | 1564141 A | 8/2005 |

* cited by examiner

*Primary Examiner* — Galen Barefoot
(74) *Attorney, Agent, or Firm* — Perman & Green, LLP

(57) ABSTRACT

A device for fixing a seat rail, designed to maintain passenger seats on a floor, wherein it includes a connecting bracket, secured to the floor and to the seat rail, the bracket being adapted to support the stresses perpendicular to the plane of the floor, and the stresses parallel to the plane of the floor. The bracket extends obliquely between the floor and the rail seat, a lower end of the bracket being secured to the floor and an upper end of the bracket being secured to the seat rail.

9 Claims, 4 Drawing Sheets

DEVICE FOR FIXING A SEAT RAIL ON A FLOOR, AND AIRCRAFT EQUIPPED WITH SUCH A FIXING DEVICE

CROSS REFERENCE TO RELATED APPLICATIONS

This application is the National Stage of International Application No. PCT/FR2006/001485, International Filing Date, 26 Jun. 2006, which designated the United States of America, and which International Application was published under PCT Article 21 (2) as WO Publication No. WO2007/003752 and which claims priority from French Application No. 0551854, filed on 30 Jun. 2005, the disclosures of which are incorporated herein by reference in their entireties.

BACKGROUND

1. Field

The disclosed embodiments relate to a device for fastening a seat rail to a floor, the seat rail being intended to maintain passenger seats fixedly on said floor. More precisely, the disclosed embodiments relate to a fastening device allowing a seat rail to be secured to a floor of a vehicle. The device according to the invention thus makes it possible for seats to be maintained fixedly on a vehicle floor.

2. Brief Description of Related Developments

The disclosed embodiments find applications particularly in the aeronautical sector. Specifically, there is generally a space available in aircraft that is intended for transporting people, this space containing seats in which the passengers can be seated. The seats are fastened to a floor by means of rails. The rails are themselves fastened to the floor. The seats and the seat rails must be able to take up impacts, particularly during crashes, in order to be maintained in position on the floor under all circumstances.

The disclosed embodiments also find applications in all types of vehicle, such as a motor vehicle.

The disclosed embodiments can also find applications in amusement parks, for rides in which a carriage, containing passenger seats, is subjected to numerous turbulent motions.

Generally, the disclosed embodiments find applications starting when the floor to which the seat rail is fastened can be rendered mobile.

SUMMARY

An aircraft generally comprises at least one cabin in which a number of rows of passenger seats are aligned. The passenger seats are fastened to the floor of the fuselage by means of a plurality of rails. More precisely, the legs of the seats are fastened to the rails. The rails most often extend parallel to the axis of the aircraft.

Throughout the aircraft, the rails rest on crossmembers situated at the aircraft floor level, said crossmembers being fastened to the floor. However, in the region of the landing gear boxes of the aircraft, the rails are too far away from the floor so that it is not possible to rest said rails on crossmembers. It is thus known practice, in the region of the landing gear boxes, to maintain the rails in place using appended fastening systems. Thus, each rail, in the region of the landing gear boxes, is connected to the floor of the aircraft by means of a link rod on which it is articulated.

The central rails, that is to say the rails which are not adjacent to the side walls of the aircraft, are moreover maintained in position with respect to one another by floor panels. The floor panels are fastened between two adjacent central rails, and form a false floor above the bottom part of the aircraft that contains the floor and the seat rails.

As regards the external rails, that is to say the rails adjacent to the side walls of the aircraft, they are maintained in place not only by link rods but also by anti-crash elements. Specifically, during a crash, the entire floor of the aircraft is thrown forward and all the crash forces are transmitted to the external rails. By crash is meant a crumpling or a sudden landing of the aircraft, or an impact which, as far as the forces involved are concerned, approximates to a sudden landing.

In order to ensure that the external rails withstand the crash forces, it is thus known practice to fasten them to the side wall of the aircraft by means of anti-crash elements. The anti-crash elements are secured on the one hand to a side wall of the aircraft and on the other hand to an external side face of the external rail. By external side face is meant that side of the rail directed toward the side wall of the aircraft.

The drawback with such a double-fastening system for the external rails using link rods and anti-crash elements is that it contributes to increasing the total mass of the aircraft. Moreover, because of the existence of these two independent fastening means, namely the link rod and the anti-crash element, the time required to mount the seat rails in an aircraft is increased, and there are also increased risks of errors in mounting said rails.

To solve these problems, the disclosed embodiments provide a system for fastening passenger seats to the floor of a vehicle comprising a seat rail, to which the seats are fastened, and a fastening device allowing fastening between said seat rail and the floor. The fastening device comprises a main part situated between the floor of the vehicle and the rail itself. The main part of the fastening device is designed to ensure a structural absorption of the rail. More precisely, the main part is designed to absorb forces parallel and perpendicularly to the axis of the vehicle, and in a vertical plane. Thus, the rail is equally well capable of withstanding frontal impacts, such as those due to a crash, and turbulence and impacts to which, in general, a flying and/or rolling vehicle may be subjected.

The main part of the fastening device has a boomerang-type general shape, that is to say a Z shape. More precisely, said part extends transversely in a plane parallel to the axis of the vehicle and perpendicular to the floor of the vehicle. A bottom end of the main part is secured to the floor and a top end is secured to the rail and to a vertical wall. The main part is designed to take up the horizontal forces, parallel to the floor of the vehicle, owing to the very geometry of said part. Specifically, the main part extends from the rear toward the front of the vehicle. By rear and front is meant rear and front with respect to the direction of forward travel of the vehicle in question. The main part can moreover bend slightly in order to take up the vertical impacts perpendicular to the axis of the vehicle.

By means of a single part whose weight is less than the weight of the two parts of the conventionally used prior art device, it is possible to absorb all the forces so as to maintain the seats in position on the floor of a vehicle. Moreover, the fastening device of the disclosed embodiments can make it possible to reinforce the stiffness of any vertical separating partitions fastened to the floor.

The subject of the disclosed embodiments are therefore a device for fastening a seat rail that is intended to maintain passenger seats on a floor, characterized in that it comprises a connecting bracket secured on the one hand to the floor and on the other hand to the seat rail, said bracket being designed to bear forces perpendicular to the plane of the floor and forces parallel to the plane of the floor.

In specific exemplary embodiments, it is possible to provide some or all of the following additional features:

the bracket extends obliquely between the floor and the seat rail, a bottom end of the bracket being secured to the floor and a top end of said bracket being secured to the seat rail;

the top end of the bracket is also secured to a compartment-forming wall of the floor, said wall being vertical and perpendicular to the seat rail;

the fastening device comprises an intermediate part designed to secure the bracket to the seat rail;

the bracket is made of aluminum;

the bracket is dimensioned to withstand cases of compressions.

Specifically, in certain flight conditions, for example during a takeoff, the acceleration is directed rearwardly.

Another subject of the disclosed embodiments are an aircraft equipped with at least one such fastening device.

The aircraft according to the disclosed embodiments may also comprise some or all of the following additional features:

the fastening device connects an external seat rail to a floor forming the roof of a landing gear box of said aircraft;

the aircraft comprises seven successive fastening devices arranged along the external seat rail at the level of the floor of the aircraft forming the roof of the landing gear box of said aircraft.

The disclosed embodiments will be better understood on reading the description which follows and on examining the figures which accompany it. They are presented by way of illustration and are in no way intended to limit the disclosed embodiments. In the figures:

DETAILED DESCRIPTION OF THE DRAWINGS

Figure 1:
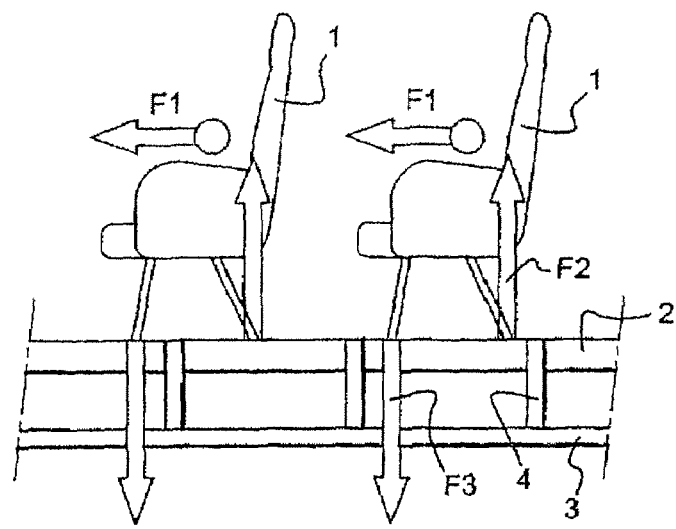
FIG. 1 shows a schematic representation of two passenger seats fastened along a common rail, and forces to which the seats and the rail may be subjected.

FIG. 1 shows two passenger seats 1 maintained fixedly with respect to a floor 3 of a vehicle by means of rails 2 (only one rail is visible in FIG. 1) and of a device 4 for fastening the rails 2 to the floor 3.

During a crash, or more generally a frontal impact, the rail 2 needs to be able to withstand crash forces F1 so that said rail 2 and the seats 1 are not ripped from the floor 3 and thrown toward the front of the vehicle. The crash forces F1 are the forces exerted parallel to the plane P1 of the floor 3. It is also required for the seats 1 and the rail 2 to be able to bear the weight of the passengers, together with the turbulence to which, in general, the vehicle may be subjected. The rail 2 and the seats 1 must thus withstand the forces F2, F3 perpendicular to the plane P1 of the floor 3.

Hence, the device 4 for fastening the rail 2 to the floor 3 must be designed to absorb the crash forces F1 and the forces F2, F3 perpendicular to the plane P1 of the floor 3.

Figure 2:
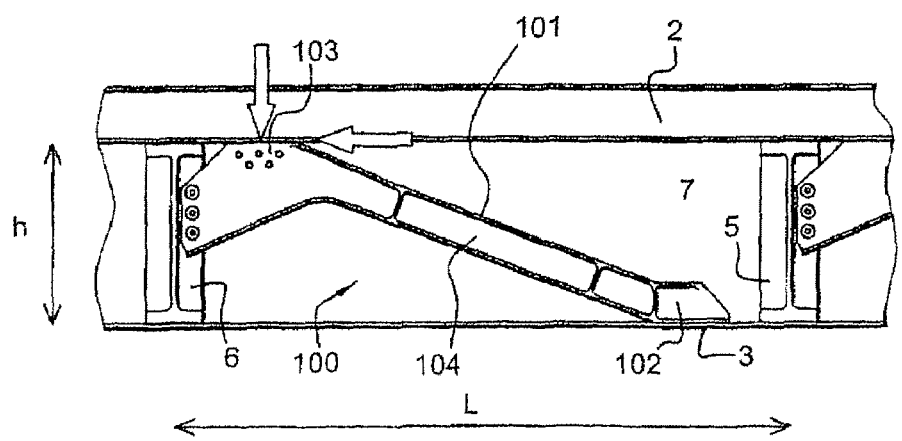
FIG. 2 shows a sectional view of a floor and a seat rail at the location of the fastening device according to the disclosed embodiments.

FIG. 2 shows an exemplary embodiment, according to the disclosed embodiments, of a device 100 for fastening a seat rail 2 to the floor 3 of a vehicle, such as an aircraft.

The fastening device 100 is designed to absorb all the forces F1, F2, F3 to which the seats 1 and the rails 2 may be subjected.

The fastening device 100 comprises a connecting bracket 101. A bottom end 102 of the bracket 101 is secured to the floor 3 of the aircraft. A top end 103 of the bracket 101 is secured to the rail 2. By bottom end 102 of the bracket 101 is meant the end situated at the level of the floor 3. By top end 103 is meant the end which is opposite to the bottom end and situated at the level of the rail 2. The bottom end 102 is situated below the top end 103 with respect to the rail 2. A body 104 of the bracket 101 extends obliquely from the bottom end 102 as far as the top end 103.

The floor 3 of the aircraft has walls 5, 6 extending vertically on the floor 3, between said floor 3 and the rails 2, so as to form compartments 7 on the floor 3 (only one compartment is shown in FIG. 2). More precisely, a rear vertical wall 5 and a front vertical wall 6, on the floor 3, define a space forming a compartment 7.

The connecting bracket 101 is housed in the compartment 7. The bottom end 102 of the bracket 101 is situated in the vicinity of the rear vertical wall 5, whereas the top end 103 of the bracket 101 is situated in the vicinity of the front vertical wall 6. The bracket 101 extends along a length L of the compartment 7 and over the height h of said compartment 7. By length L of the compartment 7 is meant the dimension of the compartment 7 in a direction parallel to the rail 2. By height h of the compartment 7 is meant the dimension of the compartment 7 perpendicularly to the rail 2. The bracket 101 is therefore arranged obliquely in this compartment 7.

The top end 103 of the bracket 101, secured to the external rail 2, is also secured to the front vertical wall 6 of the compartment 7, for example by means of screws, or by welding, or any securing means. The connection between the front vertical wall 6 and the bracket 101 makes it possible to stiffen said front wall 6, and hence more generally to stiffen the compartment 7.

Figure 5:
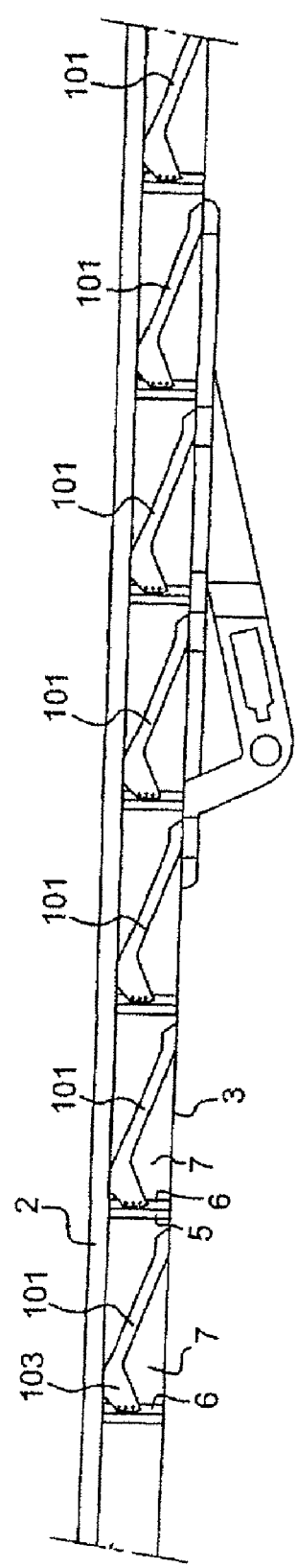
FIG. 5 shows a schematic sectional representation of a plurality of fastening devices according to the disclosed embodiments at the location of a landing gear box of an aircraft.

If the floor 3 has a plurality of compartments 7, the front vertical wall 6 of a first compartment 7 forms the rear vertical wall 5 of a second compartment 7 situated further forward with respect to the first compartment 7 in question. For example, in the specific case of a floor 3 situated in the region of a landing gear box of the aircraft, said floor 3 has seven successive compartments 7 (FIG. 5).

Figure 3A:
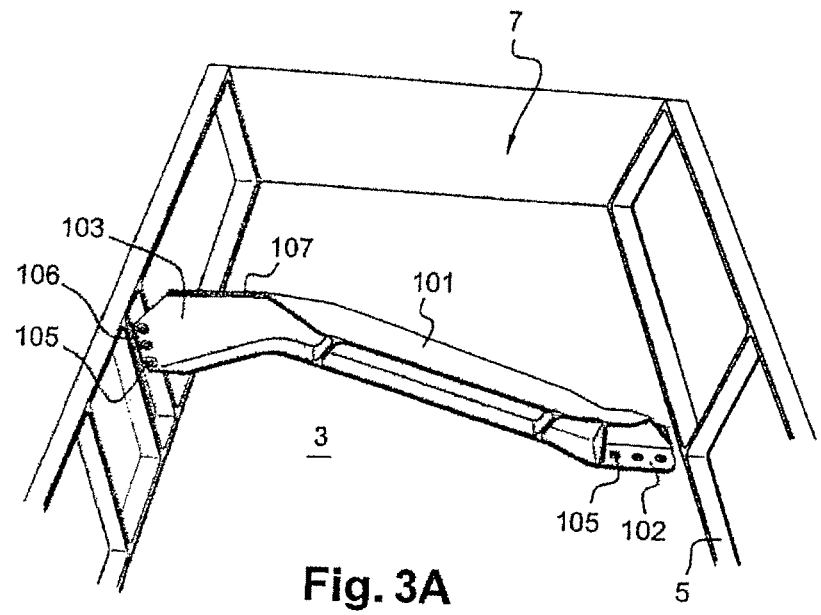
FIGS. 3A and 3B show a representation of an exemplary embodiment of the fastening device of the disclosed embodiments, devoid of a seat rail (FIG. 3A) and provided with a seat rail (FIG. 3B)

FIG. 3A shows the fastening device 100 according to the disclosed embodiments devoid of the rail 2. More precisely, FIG. 3A shows such a fastening device 100 in the region of the landing gear box of an aircraft, said fastening device 100 being intended to receive an external rail 2.

The bracket 101 extends from the rear vertical wall 5 as far as the front vertical wall 6 of a compartment 7. The bottom end 102 of the bracket 101 is fastened to the floor 3 by means of screws 105. The top end 103 of the bracket 101 is secured to the front vertical wall 6 of the landing gear compartment 7, likewise by means of screws 105. More precisely, a front tip 106 of the top end 103 of the bracket 101 is secured to the front vertical wall 6 of the compartment 7. The tip 106 of the top end 103 of the bracket 101 extends in a plane perpendicular to the front vertical wall 6 of the compartment 7 and to the plane of the floor 3.

The external rail 2 (not shown in FIG. 3A) is intended to be secured to an upper face 107 of the top end 103 of the bracket 101. By upper face 107 is meant the upwardly directed face as opposed to a downwardly directed face, that is to say a face directed toward the floor 3.

Figure 3B:
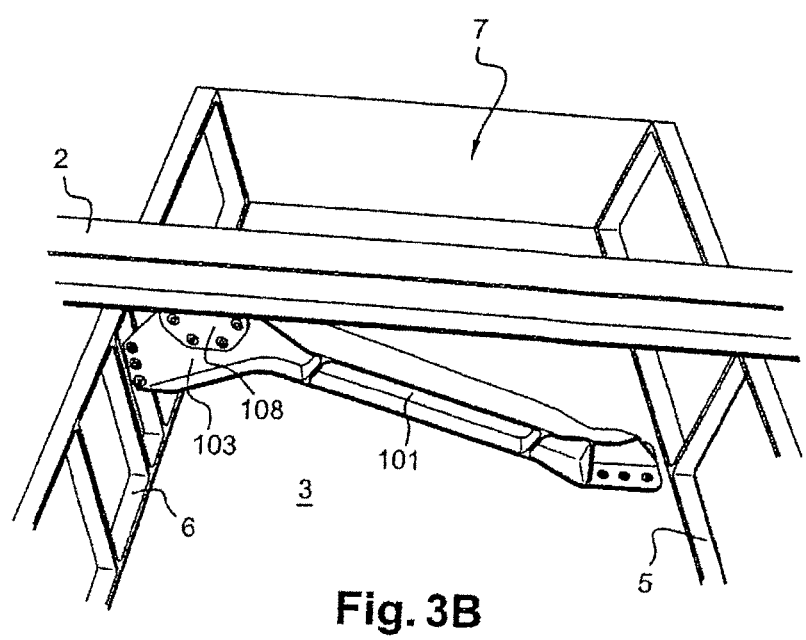

FIG. 3B shows the fastening device 100 of FIG. 3A, on which the external rail 2 rests. The external rail 2 is fastened to the top end 103 of the bracket 101 by means of an intermediate part 108.

The external rail 2 extends parallel to the bracket 101 and passes across the upper portion of the successive compartments 7 along the length L of said compartments 7.

Figure 4A:
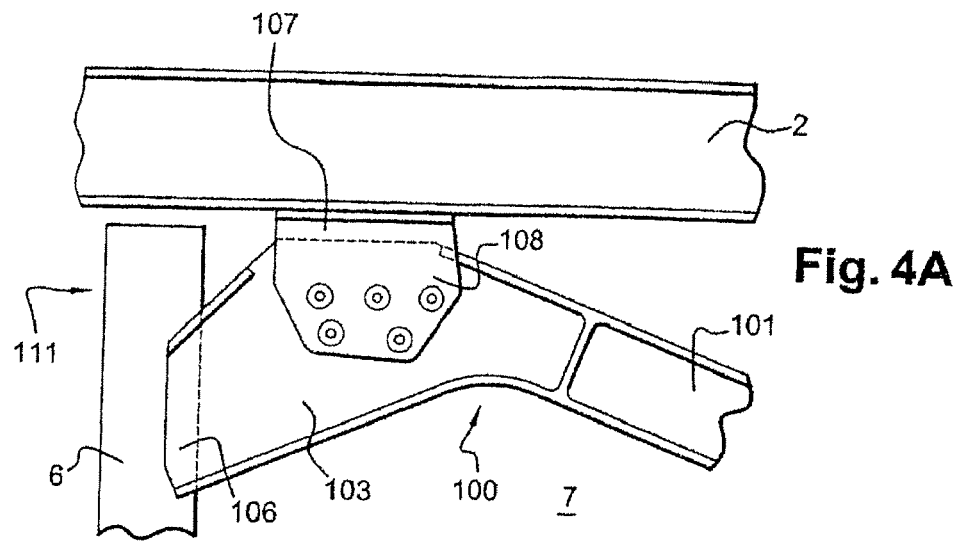
FIGS. 4A, 4B and 4C show a schematic representation of a specific exemplary embodiment of the fastening device according to the disclosed embodiments.

FIG. 4A shows an enlargement of the fastening device 100 of the disclosed embodiments at the location of the top end 103 of the bracket 101. The tip 106 of the top end 103 is secured to the free end 111 of the front vertical wall 6 of the compartment 7. By free end 111 of the wall 6 is meant that end of the vertical wall 6 which is situated at the level of the external rail 2 as opposed to that end of said wall 6 which is secured to the floor 3.

Figure 4B:
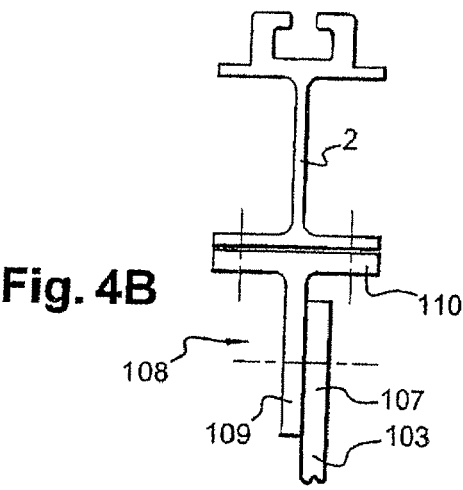

The top end 103 of the bracket 101 is secured to the external rail 2 by means of the intermediate element 108. The intermediate element 108 has the general shape of a T, as is shown in FIG. 4B.

The upper face 107 of the top end 103 of the bracket 101 is fastened to the vertical portion 109 of the T-shaped intermediate element 108. The external rail 2 is fastened to the intermediate element 108 by the horizontal portion 110 of the T. Thus, the rail 2 rests across its full width I on the intermediate element 108. By width I is meant the dimension of the rail 2 parallel to the plane of the floor and perpendicular to the longitudinal axis of said rail.

Figure 4C:
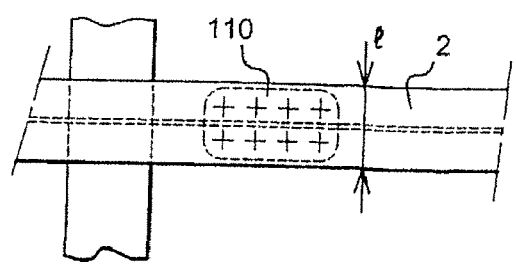

FIG. 4C shows a phantom view, below the external rail 2, of the horizontal portion 110 of the intermediate element 108.

In another exemplary embodiment, it is possible to fasten the rail 2 directly to the connecting bracket 101, that is to say without any intermediate element 108 being used. In that case, it is possible to provide for the upper face 107 of the top end 103 of the bracket 101 to have a flat portion. By flat portion is meant that the upper face 107 extends in a plane which is horizontal to the plane of the floor 3. Thus, the external rail 2 has its full width I resting on the flat upper face 107.

In one specific exemplary embodiment of the bracket 101, said bracket 101 has a length L approximately equal to 600 mm, a height h approximately equal to 151 mm and a thickness approximately equal to 4 mm. The width I of the horizontal portion 110 of the intermediate element 108 is approximately equal to 83 mm. If the top part 103 of the bracket 101 is mounted directly on the rail 2, the flat upper portion 107 of the top part 103 of the bracket 101 has a width approximately equal to 83 mm.

FIG. 5 shows an external rail 2 at the location of a landing gear box of the aircraft. The floor 3 of the aircraft forms the roof of the landing gear box situated below said floor 3. Seven compartments 7 extending successively along the rail 2 are formed on said floor 3.

Each compartment 7 comprises a connecting bracket 101. A compartment 7 is defined by a rear vertical wall 5 and by a front vertical wall 6, the rear vertical wall 5 of a front compartment 7 forming the front vertical wall 6 of an adjacent rear compartment 7.

Using the fastening device 100 according to the disclosed embodiments to fasten the external rail 2 of an aircraft at the location of a landing gear box, or more generally to fasten a seat rail to a floor of a vehicle, substantially decreases the total mass of the fastening devices 100 required to fasten the external rail 2.

Specifically, the average weight of the fastening device 100 according to the disclosed embodiments is approximately 800 g, whereas the customarily used prior art fastening devices weigh approximately 1 kg.

The fastening device according to the disclosed embodiments make it possible to significantly reduce the total mass of the system for fastening passenger seats to a floor of a vehicle.

Moreover, the bracket 101 makes it possible to stiffen the vertical compartment-forming walls 5, 6 of the floor 3.

Thus, in a general manner, the fastening device 100 of the disclosed embodiments make it possible to take up the crash forces and the vertical forces and also to reinforce the stiffness of the compartments 7 formed on the floor 3.

A single part, formed by the connecting bracket 101, therefore makes it possible to perform three functions which have up until now been performed by three separate parts.

The invention claimed is:

1. An aircraft floor comprising seat rails extending parallel to one another, wherein an external seat rail is secured to the floor by means of at least one fastening device comprising a connecting bracket, said bracket being designed to bear forces perpendicular to the plane of the floor and forces parallel to the plane of the floor and in that the connecting bracket has a Z shape, a bottom end of the bracket being secured to the floor and a top end of said bracket being secured to the seat rail, the body of the bracket extending obliquely between the top end and the bottom end.

2. The aircraft floor as claimed in claim 1, wherein the fastening device comprises an intermediate part designed to secure the bracket to the seat rail.

3. The aircraft floor as claimed in claim 2, wherein the intermediate part comprises a flat portion secured to the rail and a vertical portion secured to the top end of the bracket.

4. The aircraft floor as claimed in claim 1, wherein the top end of the bracket has a flat upper face on which the rail is intended to rest.

5. The aircraft floor as claimed in claim 1, wherein the bracket is made of aluminum.

6. The aircraft floor as claimed in claim 1, wherein it forms the roof of a landing gear box.

7. The aircraft floor as claimed in claim 1, wherein it is segmented into compartments by vertical compartment-forming walls, a connecting bracket being housed in each compartment.

8. The aircraft floor as claimed in claim 7, wherein the top end of at least one bracket is secured to an adjacent compartment-forming wall.

9. An aircraft, wherein it comprises at least one floor as claimed in claim 1.

* * * * *

UNITED STATES PATENT AND TRADEMARK OFFICE
CERTIFICATE OF CORRECTION

PATENT NO. : 8,123,164 B2
APPLICATION NO. : 11/994237
DATED : February 28, 2012
INVENTOR(S) : Ricaud It is certified that error appears in the above-identified patent and that said Letters Patent is hereby corrected as shown below:

First Page, Col. 1 (73) Assignee delete "Tououse" and insert -- Toulouse --, therefor.

Signed and Sealed this
Eighth Day of May, 2012

David J. Kappos
*Director of the United States Patent and Trademark Office*